United States Patent
Kaeb et al.

(10) Patent No.: US 9,862,545 B2
(45) Date of Patent: Jan. 9, 2018

(54) ROLLER GUARD WITH DISCHARGE FOR FRICTION-DRIVEN SWEEP CONVEYOR

(71) Applicant: Illinois Grain & Seed, Inc., Cissna Park, IL (US)

(72) Inventors: Todd W. Kaeb, Cissna Park, IL (US); Andrew L. Stock, Cissna Park, IL (US); Nathan L. Kaeb, Cissna Park, IL (US)

(73) Assignee: Illinois Grain & Seed, Inc., Cissna Park, IL (US)

( * ) Notice: Subject to any disclaimer, the term of this patent is extended or adjusted under 35 U.S.C. 154(b) by 0 days.

(21) Appl. No.: 15/251,965

(22) Filed: Aug. 30, 2016

(65) Prior Publication Data

US 2017/0190513 A1    Jul. 6, 2017

Related U.S. Application Data

(60) Provisional application No. 62/212,565, filed on Aug. 31, 2015, provisional application No. 62/327,566, filed on Apr. 26, 2016.

(51) Int. Cl.
| | |
|---|---|
| *B65G 45/12* | (2006.01) |
| *B65G 21/08* | (2006.01) |
| *B65G 21/10* | (2006.01) |
| *B65G 65/42* | (2006.01) |
| *B65G 39/00* | (2006.01) |

(52) U.S. Cl.
CPC .............. *B65G 21/08* (2013.01); *B65G 21/10* (2013.01); *B65G 39/00* (2013.01); *B65G 45/12* (2013.01); *B65G 65/425* (2013.01)

(58) Field of Classification Search
CPC ...... B65G 21/08; B65G 21/10; B65G 65/425; B65G 45/16; B65G 45/26
See application file for complete search history.

(56) References Cited

U.S. PATENT DOCUMENTS

| | | | | |
|---|---|---|---|---|
| 689,881 | A | * 12/1901 | Hoy | B65G 45/12 198/497 |
| 2,801,730 | A | 8/1957 | Strickler | |
| 4,202,437 | A | * 5/1980 | Gordon | B65G 45/12 15/256.5 |

(Continued)

FOREIGN PATENT DOCUMENTS

DE    3940786 C1    12/1991

OTHER PUBLICATIONS

Machine translation of Foreign Patent Citation 1—Patent No. DE3940786C1.

*Primary Examiner* — Mark A Deuble
(74) *Attorney, Agent, or Firm* — Coughlin Law Office; Daniel J. Coughlin

(57) ABSTRACT

We disclose a roller guard with discharge for friction-driven sweep conveyors. This disclosure limits the introduction of particulate matter into the interface between a driven roller and an inner surface of a continuous conveyor belt. The roller guard assembly is mounted between an upper belt portion and a lower belt portion near the drive roller and has a retaining wall member oriented at an angle that is neither parallel with nor at a right angle to the longitudinal axis of the belt and at such an angle that particulates carried on the inner surface of the lower belt portion are directed toward the discharge aperture in the first sidewall.

19 Claims, 8 Drawing Sheets

(56) References Cited

U.S. PATENT DOCUMENTS

| | | | | |
|---|---|---|---|---|
| 4,944,386 A * | 7/1990 | Swinderman | .......... | B65G 45/12 |
| | | | | 15/256.5 |
| 5,355,992 A * | 10/1994 | Baig | .............. | B65G 45/24 |
| | | | | 198/495 |
| 5,660,283 A * | 8/1997 | Groh | .............. | B65G 19/14 |
| | | | | 198/690.2 |
| 6,318,545 B1 | 11/2001 | Ross, II | | |
| 7,014,035 B2 | 3/2006 | Wiggins | | |
| 7,383,944 B2 | 6/2008 | Hall | | |
| 7,484,617 B1 | 2/2009 | Flood, Jr. | | |
| 7,882,943 B1 * | 2/2011 | Schoonover | .......... | B65G 45/12 |
| | | | | 198/497 |
| 8,770,390 B2 * | 7/2014 | Neufeld | ............. | B65G 21/14 |
| | | | | 198/812 |
| 9,199,807 B1 * | 12/2015 | Schuelke | ............. | B65G 65/40 |
| 9,288,946 B1 * | 3/2016 | Schuld | ............. | A01F 25/2018 |
| 2014/0262688 A1 * | 9/2014 | Brunone | ............. | B65G 45/16 |
| | | | | 198/499 |
| 2016/0107843 A1 * | 4/2016 | Hartney | ............. | B65G 45/12 |
| | | | | 198/497 |

\* cited by examiner

ROLLER GUARD WITH DISCHARGE FOR FRICTION-DRIVEN SWEEP CONVEYOR

CROSS REFERENCES

This application claims the benefit of U.S. Provisional Application No. 62/212,565 filed Aug. 31, 2015 and U.S. Provisional Application No. 62/327,566, filed Apr. 26, 2016.

REFERENCE TO CDS

Not Applicable.

FIELD OF THE INVENTION

The present disclosure relates to sweeps for agricultural grain storage bins, and more particularly, to sweep devices used primarily, but not exclusively, for removing residual seed and grain from a storage bin after the majority of grain or seed has been removed by an underlying conveyor.

BACKGROUND

Seed and grain are commonly stored in grain bins and related storage structures. Rotating sweep conveyors are commonly used to remove seed or grain from the floor of a grain storage bin. Sweep conveyors rotate about a central pivot point. These sweep conveyors sweeping residual seed or grain toward a central discharge chute for transferring the seed or grains to a wait truck, trailer, rail car, etc. Sweep conveyors of this nature are commonly screw auger type or chain driven paddle conveyors. Power can either be transferred from the unload conveyor—as described in U.S. Pat. No. 7,544,031—or the sweep can be powered with a dedicated electric motor, or equivalent power source. The sweep conveyor transfers power from the power source, through the auger or chain to turn an idler roller. The idler roller is coupled to a distal drive wheel such that power is transferred from the conveyor to the drive wheel. The driven wheel is mounted perpendicular to the length of the sweep conveyor and drives the sweep about the pivot point, like the hand of a clock.

SUMMARY

We disclose a sweep conveyor that has a friction-driven belt conveyor for the safe removal of grain piles without manual user intervention and that also prevents dust and particulate from affecting the coupling of the drive roller to the inner surface of the conveyor belt. In existing grain bin unload systems, the stored grain is discharged through a central well before a sweep auger is employed to remove the residual grain.

The conveyor belt is stretched between two end rollers: a driven roller and a second roller. The driven roller and the second roller are mounted at the opposite ends of a sweep conveyor frame. The sweep conveyor frame has a top wall, a leading sidewall, and a trailing sidewall. The idler roller is mounted on a tracking assembly that slides along the conveyor frame on a series of guiderails. The conveyor belt has an upper belt portion that is moving toward the idler roller and a lower belt portion that is moving toward the driven roller. The conveyor belt itself has an outer surface that is oriented toward the product and an inner surface that contacts the end rollers.

The conveyor belt is powered by a driven roller. The power source can be a dedicated motor or by coupling the driven roller to the unload conveyor. In existing sweep conveyors, the driven roller commonly used is a toothed sprocket that engages a chain belt. Chain belts have been preferred because the sweeps are used in conditions where the sweep is submerged in the seed or grain within the storage bin. Particulates, such as dust, grains, or seed, compromise the ability of the driven roller to maintain sufficient friction with the inner belt surface.

We disclose a friction-driven sweep conveyor having a roller guard assembly to prevent particulate matter from entering into the interface between a driven roller and an inner surface of a continuous conveyor belt. The roller guard assembly can be comprised of a retaining wall member and a mounting member.

At least one roller guard assembly is disposed adjacent to the driven roller. The roller guard assembly is positioned to prevent a substantial amount of particulate from entering the area of the conveyor where the roller interfaces with the belt. In this way, a roller guard assembly positioned near the drive roller maintains an operable interface between the drive roller and the belt, thereby moving the belt. The angled roller guard assembly is disposed between the inner surface of the lower belt portion and the inner surface of the upper belt portion.

One advantage of the present disclosure is that it improves the transfer of energy in a friction-driven belt conveyor in operating conditions where the sweep conveyor is submerged in seed or grain stored within a storage bin. Friction-driven belt conveyor are advantageous because the roller-belt interface causes less damage to the seed and grain product than the steel toothed sprocket-chain interface.

Another advantage of the present disclosure is that the sweep can also have a discharge aperture located in one of the sidewalls of the sweep and the retaining wall can be oriented at an angle that is neither parallel with nor at a right angle to the longitudinal axis of the belt and at such an angle that particulates carried on the inner surface of the lower belt portion are directed toward the discharge aperture in the first sidewall. By discharging the material through the leading sidewall, the material is discharged into the path of the sweep conveyor. Accordingly, the grain is removed through the regular movement of the sweep.

Sweep conveyors are commonly used to remove grains from grain bins. Certain grains, like rice or other grains having higher moisture content, have a high angle of repose. As such, the grain remains in tall grain piles that are difficult for the sweep to engage. In order to remove piled grains from within a grain bin, operators currently enter the bin and manually knock down the grain while leaning over the operating sweep. Entrapment within a grain bin can result in death or serious injury. Even if death or injury does not occur, the temperature inside grain bins often exceed 100 degrees Fahrenheit with minimal air flow, making it an uncomfortable environment for manual labor.

We also disclose an apparatus for maintaining a flow of grain moving toward the sweep. A rake extending longitudinally along the sweep. The rake is disposed along the leading sidewall of the sweep such that the rake is in the path of movement of the sweep as the sweep rotates within the bin.

The rake has a plurality of projections that protrude from a shaft. In one embodiment, the projections are tines, that extend out from the shaft toward the direction of the sweep movement. In one embodiment, the projections are spring mounted. In one embodiment, the projections are fixed and inflexible. In one embodiment, the projections are removable. In one embodiment, the projections are adjustably mounted along the shaft such that the longitudinal space between projections can be changed.

A reciprocating drive assembly is connected to the driven roller and to the shaft. The reciprocating drive assembly causes the shaft to move forward and backward along the longitudinal axis of the sweep. The reciprocating shaft movement causes the projections to engage grain piles in the path of the sweep, causing the pile to collapse into a flowable particulate to be received by the sweep.

One advantage of the current disclosure is that existing sweeps are not able to adequately break up tall piles of grain. For example, rice has a very high angle of repose as shown in FIGS. 1 and 2. As such, rice does not flow well as the sweep moves about the grain bin. In order to remove piled grains from within a grain bin, operators need to enter the bin and manually knock down the grain while leaning over the operating sweep. Entrapment within a grain bin can result in death or serious injury. Even if death or injury does not occur, the temperature inside grain bins often exceed 100 degrees Fahrenheit with minimal air flow, making it an uncomfortable environment for manual labor.

Stored grain can form frozen, compacted, or bridged aggregates or chunks. Another advantage of the current disclosure is the efficient breaking apart of these hardened aggregates of grain that form within a bin. The apparatus is capable of breaking up any hardened aggregates of grain so they can be swept or augered to the center well as a flowable particulate.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein.

DETAILED DESCRIPTION

As noted above, existing belt conveyors present numerous problems when used within the dusty or submerged—whether fully or partially submerged—conditions within a storage bin.

Figure 1:
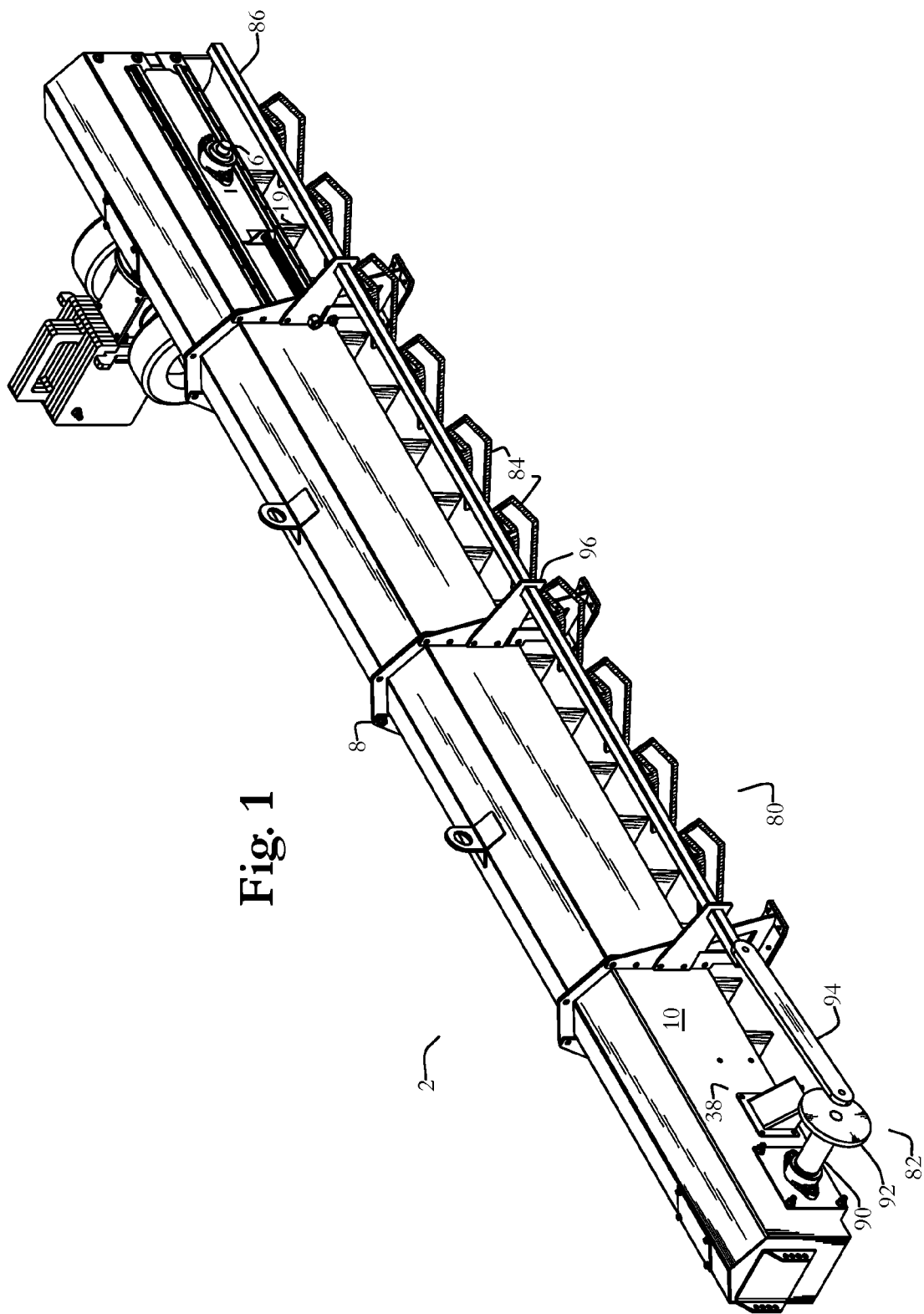
FIG. 1 shows a top side perspective view of an embodiment of the sweep and rake.

As shown in FIG. 1, we disclose a sweep conveyor 2 that is operable when submerged within grain or seed in a storage bin. The conveyor belt is stretched between two end rollers: a driven roller 4 and a second roller 6. The driven roller 4 and the second roller 6 are mounted at the opposite ends of a sweep conveyor frame 8.

Figure 2:
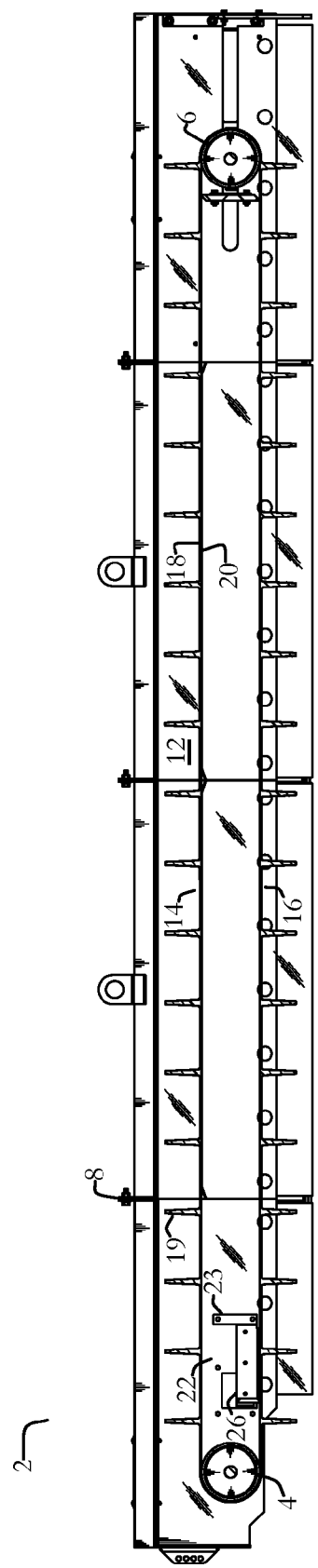
FIG. 2 shows a side perspective view of an embodiment of the sweep with the leading sidewall removed.

As shown in the cutaway view of FIG. 2, the conveyor belt has an upper belt portion 14 that is moving toward the second roller 6 and a lower belt portion 16 that is moving toward the driven roller 4. The conveyor belt itself has an outer surface that is oriented toward the bin floor and an inner surface that contacts the end rollers. The outer surface of the belt can have paddles 19. The paddles 19 can be paddles, cleats, or other similar extensions that protrude from the outer belt surface 18.

Figure 5:
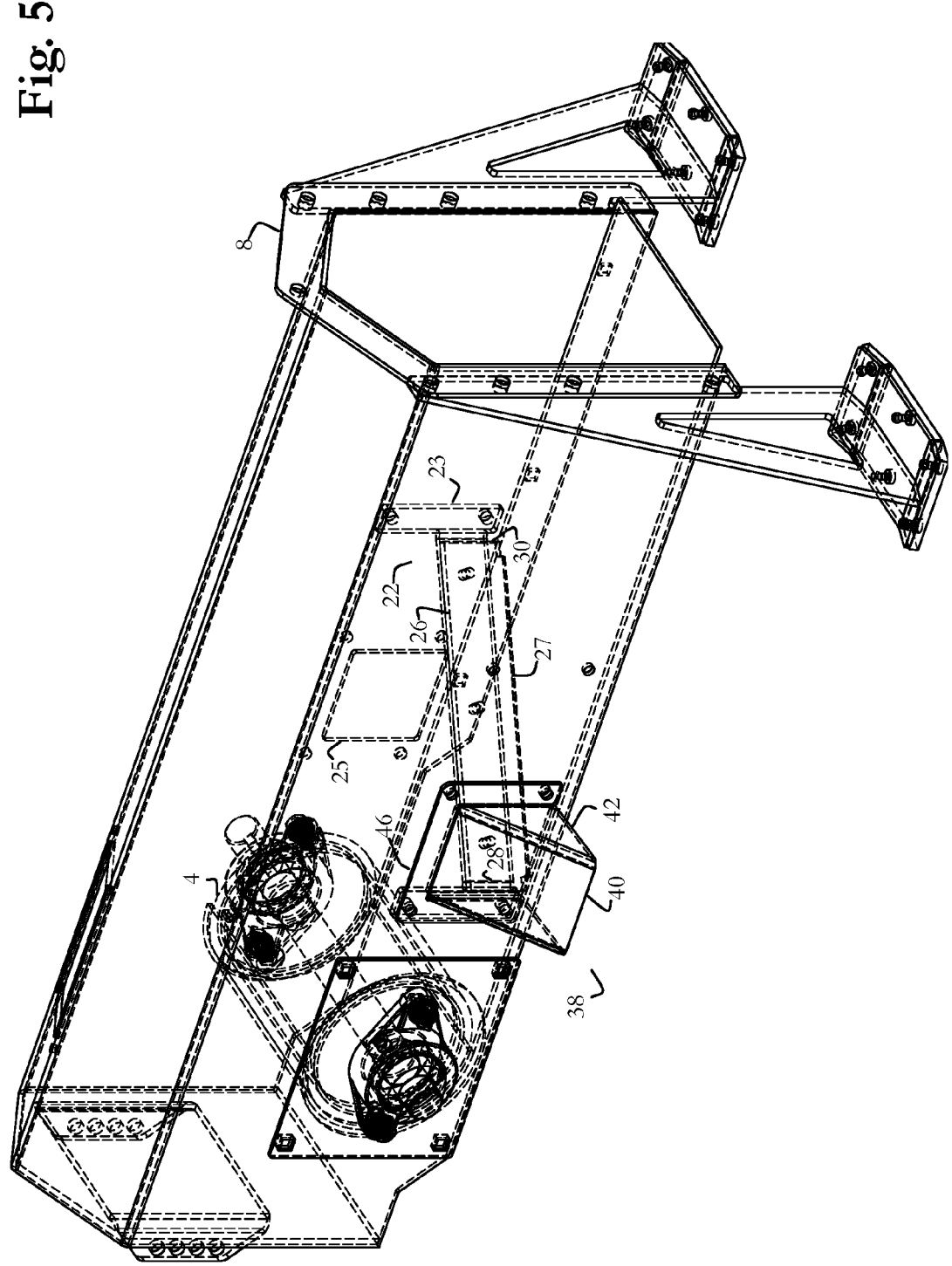
FIG. 5 shows another view of the embodiment shown in FIG. 4, wherein the internal elements of the sweep are shown as dotted lines.
Figure 6:
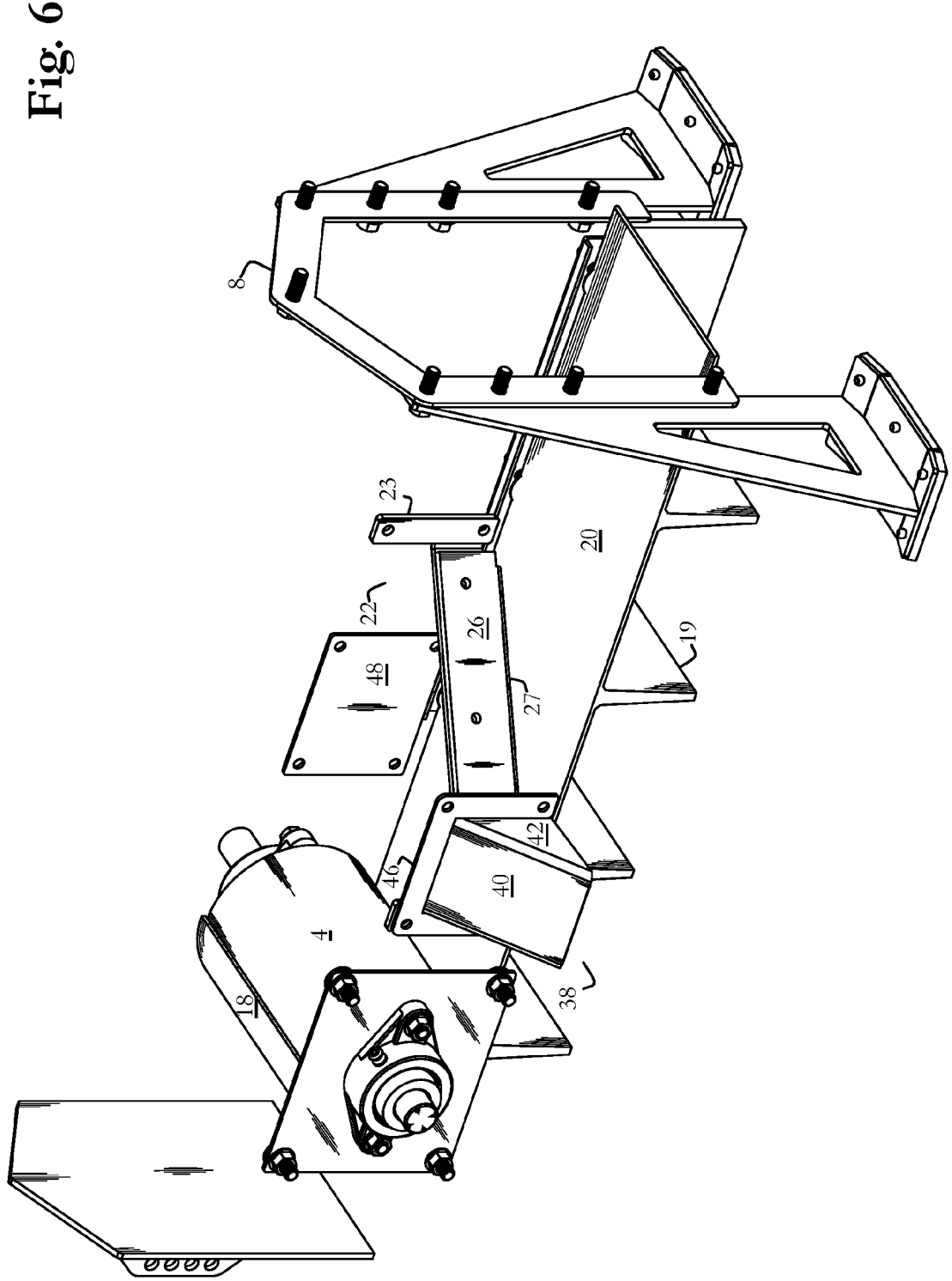
FIG. 6 shows another view of the embodiment shown in FIG. 4, wherein the walls of the conveyor frame are hidden from view and a portion of the upper belt portion is removed to reveal an embodiment of the roller guard assembly.

The sweep conveyor 2 has a friction driven belt conveyor with a roller guard assembly 22 that prevents dust and other particulates from affecting the coupling of the driven roller 4 to the inner surface of the conveyor belt. As illustrated in FIGS. 5 and 6, the sweep conveyor 2 uses a roller guard assembly 22 to prevent particulates from substantially compromising the interface between the rollers, and the inner belt surface 20. At least one roller guard assembly 22 is disposed adjacent to at least one of the driven roller 4 and the second roller 6. The roller guard assembly 22 is positioned to prevent a substantial amount of particulate from entering the area of the conveyor where the roller, interfaces with the belt. In this way, a roller guard assembly 22 positioned near the driven roller 4 in order to maintain an operable interface between the drive roller and the belt, thereby moving the belt about the sweep conveyor 2. In another embodiment, a roller guard assembly 22 positioned near the second roller 6 maintains an operable interface between the second roller 6 and the belt, thereby allowing the second roller 6 to power the drive wheel.

The roller guard assembly 22 directs particulates that have accumulated on the inner surface of the conveyor belt away from the driven roller 4. At least one roller guard assembly 22 is disposed adjacent to at the driven roller 4. The roller guard assembly 22 is positioned to prevent a substantial amount of particulate from entering the area of the conveyor where the roller interfaces with the belt. In this way, a roller guard assembly 22 positioned near the drive roller maintains an operable interface between the drive roller and the belt, thereby moving the belt. The angled roller guard assembly 22 is disposed between the inner surface of the lower belt portion 16 and the inner surface of the upper belt portion 14. One advantage of the present disclosure is that it allows the use of a friction-driven belt conveyor to operate while submerged in seed or grain stored within a storage bin. Friction-driven belt conveyor are advantageous because the roller-belt interface causes less damage to the seed and grain product than the steel toothed sprocket-chain interface.

The sweep can also have a discharge aperture 24 located in one of the sidewalls of the sweep. The discharge aperture can be seen clearly in FIG. 3. The discharge aperture 24 is preferably located adjacent to the angled roller guard assembly 22. In one embodiment, the discharge aperture 24 is disposed in the leading sidewall 10. The discharge aperture 24 can have approximately the same height as the roller guard assembly 22.

In one embodiment, the angled roller guard assembly 22 has a mounting member 23 and a retaining wall 26. In the embodiment shown in FIGS. 5-6, the mounting member 23 attaches to the conveyor frame 8, specifically the leading sidewall 10 and the trailing sidewall 12. The mounting member securely mounts to the conveyor frame 8. In one embodiment, the mounting member 23 allows vertical adjustments to the position of the retaining wall 26 relative to the conveyor frame 8. In another embodiment, the mounting member 23 allows horizontal adjustments to the position of the retaining wall 26 relative to the conveyor frame 8.

The retaining wall is made of a durable material, such as metal or plastic. In a preferred embodiment, the retaining wall is made of UHMW plastic. The retaining wall 26 extends horizontally between the leading sidewall 10 and the trailing sidewall 12. The retaining wall 26 extends downwardly to the lower belt portion 16. In a preferred embodiment, the lower edge 27 of the retaining wall 26 makes contact with the inner belt surface 20 of the lower belt portion 16. In one embodiment, the retaining wall 26 portion has a lower edge 27 that is beveled. The retaining wall member 26 is non-porous to the particulate matter being conveyed.

Figure 3:
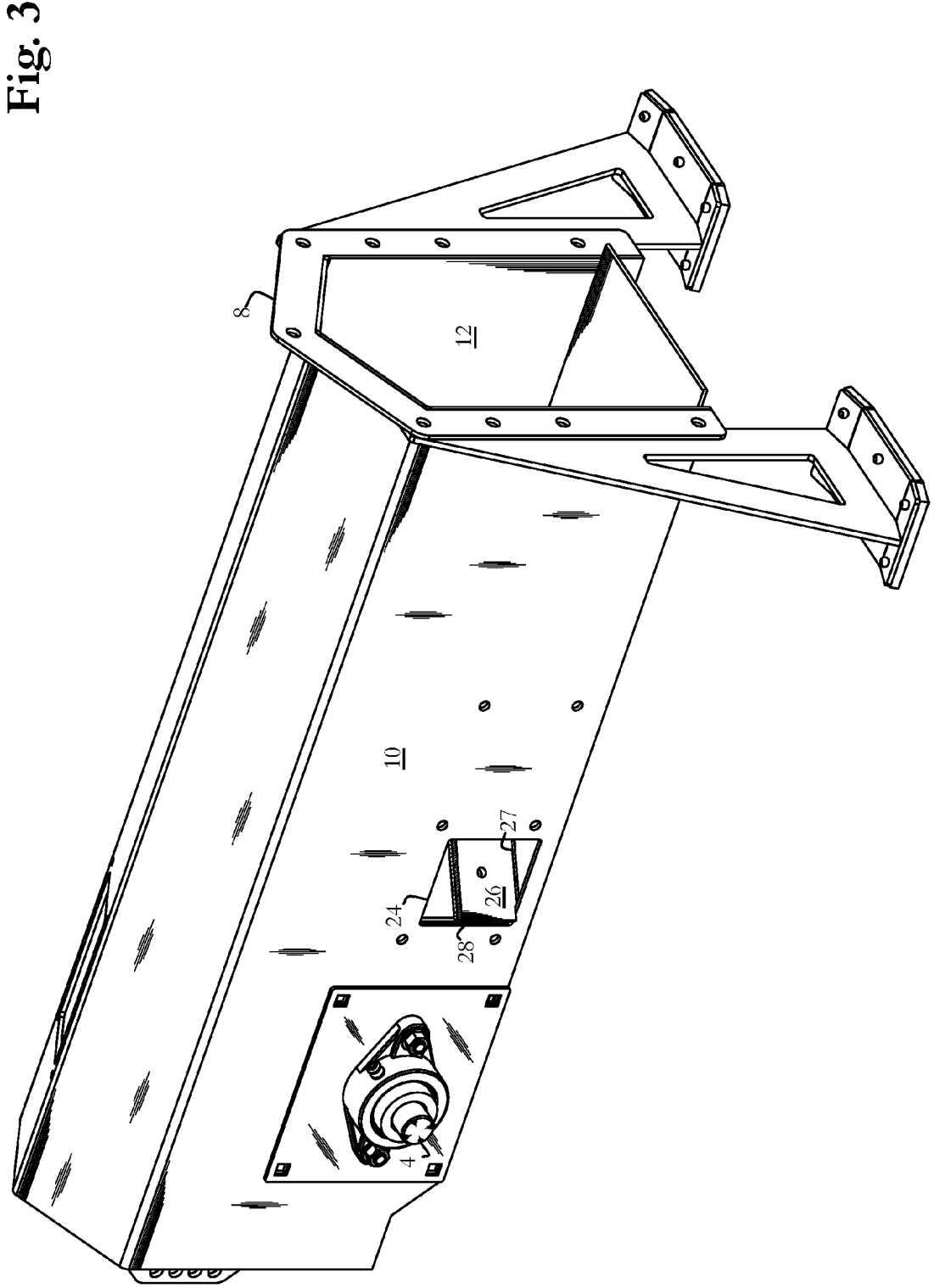
FIG. 3 shows a side perspective view of the proximal end portion of an embodiment of the sweep conveyor, with the hood removed.
Figure 4:
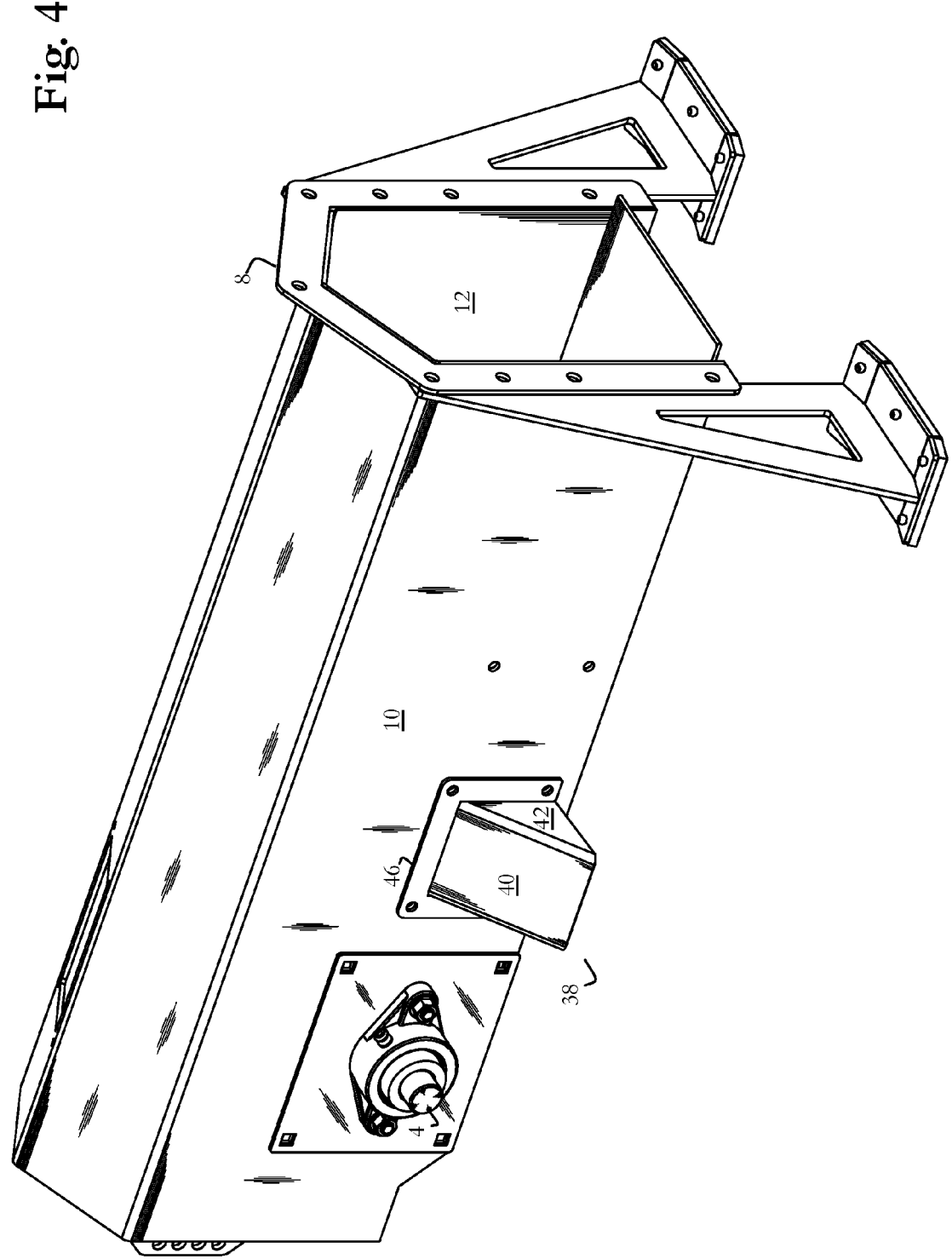
FIG. 4 shows a side perspective view of the proximal end portion of an embodiment of the sweep conveyor.

The retaining wall 26 has a discharge side 28 and a second lateral side 30. The retaining wall 26 is mounted to the mounting member 23 such that the discharge side 28 of the retaining wall 26 is disposed nearer the proximal end—the driven roller 4 end—of the sweep conveyor 2. The retaining wall 26 is mounted to the mounting member and adapted to be positioned at an angle that is neither parallel with nor at a right angle to the longitudinal axis of the belt such an angle that particulates carried on the inner surface of the lower belt portion are directed toward the first sidewall of the sweep conveyor. The discharge side 28 is mounted toward the leading sidewall 10 of the sweep conveyor 2. The second lateral side 30 can be mounted nearer the distal end—nearer the second roller 6—of the sweep conveyor 2. In this orientation, particulates that are being carried on the inner surface of the lower belt portion 16 are directed toward the discharge aperture 24 in the leading sidewall 10. In a preferred embodiment, the discharge side 28 of the roller guard assembly 22 terminates at the proximal end of the discharge aperture 24, as shown in FIG. 3. The mounting member 23 is mounted to the conveyor structure between the upper belt portion 14 and the lower belt portion 16.

One advantage of the present disclosure is that these particulates are directed into the path of the sweep. As the sweep progresses forward, any particulates discharged through the discharge aperture 24 will be collected by the sweep.

In one embodiment, the angled roller guard assembly 22 has a V-shaped cross section (not illustrated). In this embodiment, it is preferable to have a first discharge aperture 24 located in both the leading sidewall 10 and the trailing sidewall 12. The tip 36, or point, of the V-shaped cross section is oriented at the lateral center of sweep. In this orientation, particulates being carried on the inner surface of the lower belt portion 16 are directed toward the discharge aperture 24s on both lateral sides of the sweep. In this orientation, the lateral distance the particulates need to travel to be discharged is decreased relative to the angled roller guard assembly 22 having a single wall.

In another embodiment, a plurality of roller guard assemblies 22 having a single wall are longitudinally spaced apart between the second roller 6 and the driven roller 4. A discharge aperture 24 is located adjacent to at least the roller guard assembly 22 nearest the driven roller 4. However, it is contemplated that multiple discharge apertures 24 may be disposed adjacent to the plurality of roller guard assemblies 22.

In another embodiment, a plurality of roller guard assemblies 22 are disposed between driven roller 4 and the second roller 6. The roller guard assemblies 22 may have different angles of orientation, and may not extend across the entire lateral width of the sweep.

A roller guard assembly 22 positioned near the second roller 6 maintains an operable interface between the second roller 6 and the belt, thereby removing particulates that might interfere with the second roller 6 powering the drive wheel that pushes the sweep conveyor 2 about the grain bin like a clock arm. In one embodiment, a second roller guard assembly 22 is mounted near the second roller 6.

In another embodiment, a second roller guard assembly is mounted to the tracking assembly. Mounting the second roller guard assembly to the tracking assembly allows the roller guard assembly 22 to maintain proper orientation relative to the second roller 6 under various tracking and tensioning situations. For example, as the belt stretches, the adjustable tensioner needs to be extended. By mounting the roller guard assembly 22 to the tracking assembly, the relative position of the second roller guard assembly 22 and the second roller 6 will be maintained in conditions where the adjustable tensioner is extended.

It should be apparent to one skilled in the art that these mounting member 23 may be attached to the respective housing using a variety of mechanisms, such as welded rods or fasteners such as bolts or screws.

In another embodiment, a hood member 38 prevents material from entering the discharge aperture 24. The hood member 38 has a top wall 40, first side 42, second side 44, and a mounting flange 46. The hood member 38 is mounted at an upper portion of the discharge aperture 24. The hood member 38 extends outwardly from the sweep along the top and side portions of the discharge aperture 24. The hood member 38 can be slanted or curved. As illustrated in FIG. 11, the hood member 38 can be at least as tall as the discharge aperture 24. The hood member 38 prevents material from entering the sweep through the discharge aperture 24.

In another embodiment, the roller guard assembly 22 can comprise a brush cleaner. The brush is mounted to the roller guard assembly 22 and extends toward the inner surface of at least one of the upper belt portion 14 or the lower belt portion 16. In at least this embodiment, the roller guard assembly 22 would be sized such that the brush cleaner made contact with the inner surface of the inner surface of the belt. The brush extends laterally across the width of the conveyor belt.

In another embodiment, the roller guard assembly 22 can comprise shapes other than a flat, vertical, laterally extended plate. For example, it is possible that the roller guard assembly 22 have a curved cross-section, such as an S-shaped curve or a C-shaped curve.

In another embodiment, the roller guard assembly 22 is vertically adjustable to ensure a tight seal between the roller guard assembly 22 and the inner surface of the belt. This is advantageous in embodiments where the roller guard assembly 22 is made up of a plastic or other wearable material. This is also compatible in embodiments comprising the brush cleaner. Examples of vertically adjustable roller guard assembly 22 mounts include spring loaded, pneumatic or hydraulic adjustment assemblies. Another advantage to vertically adjustable roller guard assembly 22s is to maintain contact between the lower belt portion 16 and the floor of the storage bin.

For maintaining a flow of grain moving toward the sweep, a rake 80 extends longitudinally along the sweep. The rake is disposed along the leading sidewall 10 of the sweep conveyor 2 such that the rake is in the path of movement of the sweep as the sweep rotates within the bin.

Figure 7:
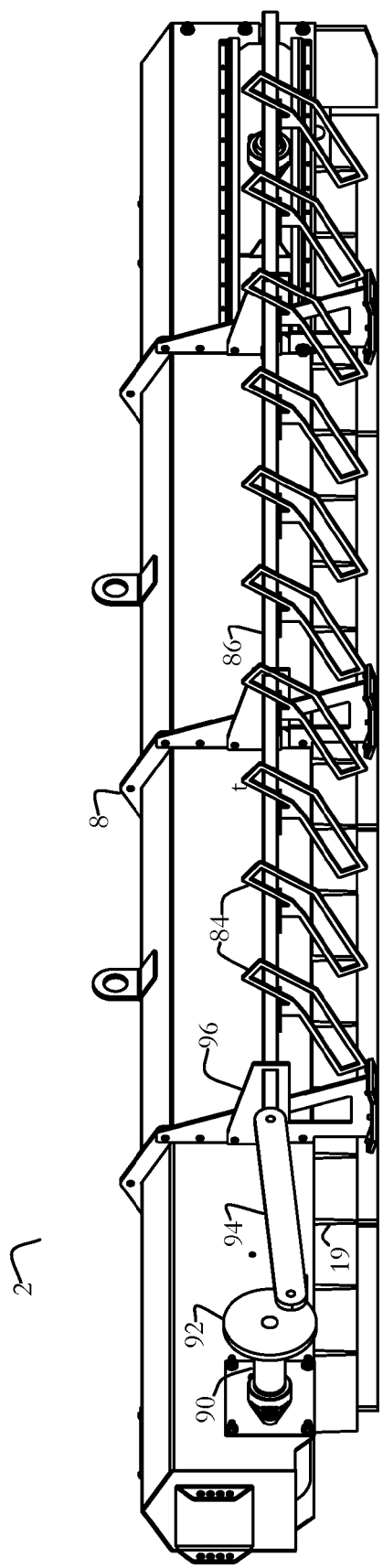
FIG. 7 shows a front side perspective view of an embodiment of the sweep conveyor showing the leading sidewall and rake.
Figure 8:
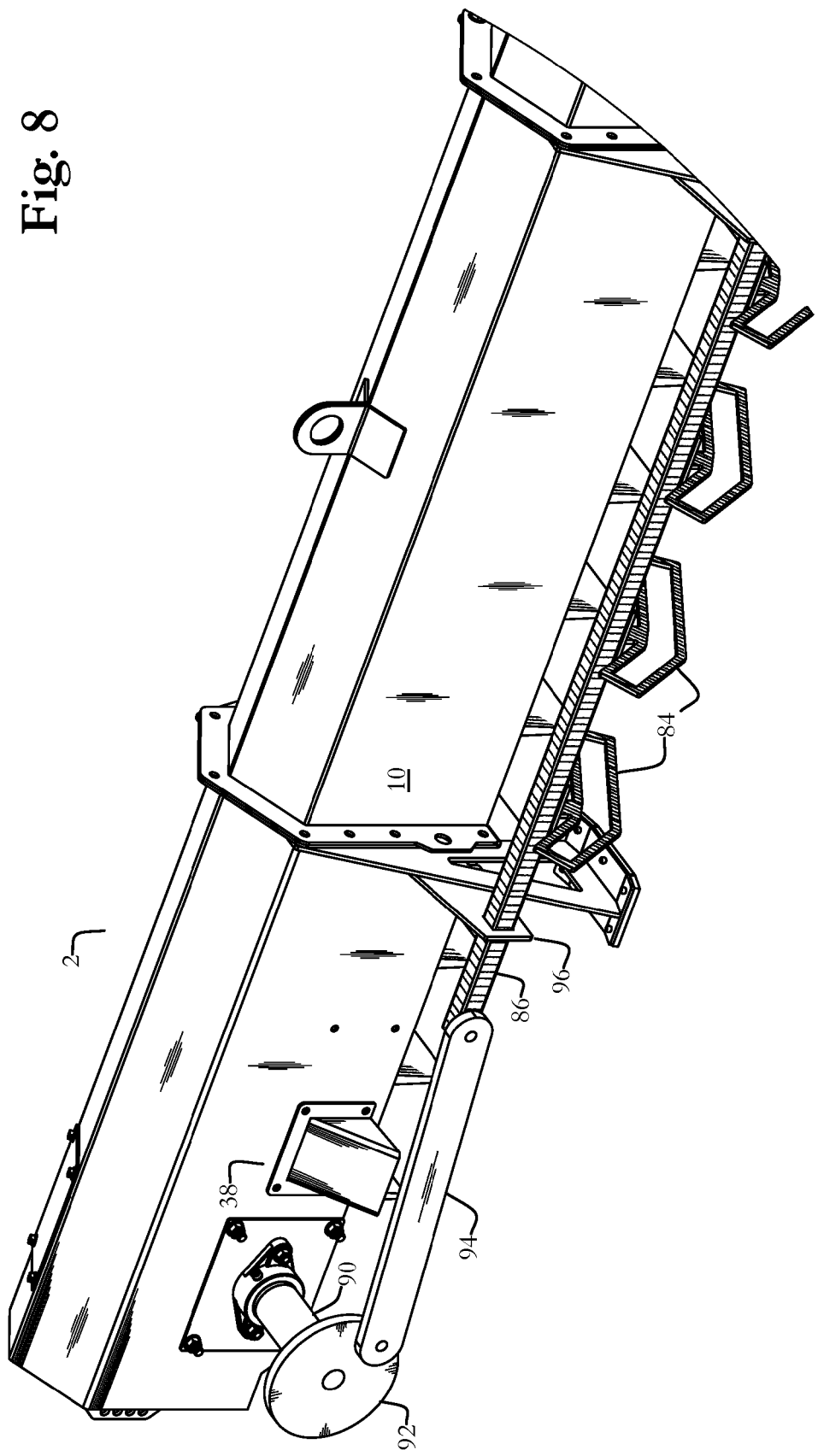
FIG. 8 shows a top side perspective view of the embodiment shown in FIG. 7, showing a closer view of the reciprocating drive assembly.

The rake has a plurality of projection units 84 that protrude from a shaft 86, as illustrated in FIGS. 1, 7, and 8. In one embodiment, the projection units 84 are tines, that extend out from the shaft 86 toward the direction of the sweep movement. In one embodiment, the projection units 84 are spring mounted. The projection units 84 are fixed to the shaft 86 and sufficiently inflexible to break up clumps of grain. In one embodiment, the projection units 84 are removably mounted onto the shaft 86. In another embodiment, the projection units 84 are securely welded onto the shaft 86. The projection units 84 units can be composed of plastic or metal. Plastic projection units 84 can include PVC or UHMW.

As shown in the embodiment of FIGS. 1, 7, and 8, the projection units 84 have a rectangular frame, with a raised front portion. The projection units 84 are mounted to the shaft 86 by welding the components together at the base of the raised portion. The projection unit 84 is merely a frame, with a hollow center. In this illustrated embodiment, the frame edge of the raised front portion of the projection unit 84 is able to penetrate the grain aggregates in the grain pile. The edge of the lower rear portion of the projection unit 84 is configured to engage grain aggregates that have fallen to the bin floor and would otherwise be too large to enter the sweep. The upward, forward angle of the projections units 84 allow the weight of the sweep conveyor 2 to work as a lever to break apart the grain aggregates. As such, the apparatus is able to provide the sweep with a continuous flow of flowable grain without manual user intervention.

A reciprocating drive assembly 82 is connected to the roller extension 90 operably coupled to the driven roller 4. A wheel 92 is operably coupled to the roller extension 90. A crank 94 has a first end that is mounted at a point on the wheel and a second end that is mounted to an end of the rake 80. In this configuration, the reciprocating drive assembly 82 converts the rotary motion of the roller 4 into linear motion at the rake 80 and causes the shaft 86 to move forward and backward along the longitudinal axis of the sweep conveyor 2.

A plurality of complementary guide elements 96 are longitudinally spaced apart along the length of the sweep conveyor 2. The complementary guide elements 96 receive the shaft 86 and allow the shaft to move backward and forward therein at a distance in front of the leading sidewall 10. In another embodiment, the guide elements can have an additional bracket mounted thereto, configured to support the shaft 86. The bracket can comprise a low-friction material, thereby facilitating the shaft 86 sliding back-and-forth in contact with the bracket.

The reciprocating shaft 86 movement causes the projection units 84 to engage grain piles in the path of the sweep, causing the pile to collapse into a flowable particulate to be received by the sweep. FIGS. 9-10 shows the reciprocating drive assembly 82 of a preferred embodiment. The driven roller 4 is rotationally coupled to wheel 92. A crank 94 connects the drive wheel with the shaft 86. The coupling rod is pivotally mounted to both the wheel 92 and the shaft 86. As the drive wheel rotates, the shaft 86 slides forward and backward along the longitudinal axis of the sweep. The reciprocating rate of the rake is determined by the diameter of the drive wheel and the rotational speed of the driven roller 4.

One advantage of the current disclosure is that existing sweeps are not able to adequately break up tall piles of grain. For example, rice has a very high angle of repose. As such, rice does not flow well as the sweep moves about the grain bin. In order to remove piled grains from within a grain bin, operators need to enter the bin and manually knock down the grain while leaning over the operating sweep. Entrapment within a grain bin can result in death or serious injury. Even if death or injury does not occur, the temperature inside grain bins often exceed 100 degrees Fahrenheit with minimal air flow, making it an uncomfortable environment for manual labor.

Stored grain can form frozen, compacted, or bridged aggregates or chunks. Another advantage of the current disclosure is the efficient breaking apart of these hardened aggregates of grain that form within a bin. The apparatus is capable of breaking up any hardened aggregates of grain so they can be swept or augered to the center well. Stored grain is generally found as a flowable particulate.

In one embodiment, the projection units 84 are adjustably mounted along the shaft 86 such that the longitudinal space between projection units 84 can be changed. The projection units 84 can comprise any combination of fingers, blades, paddles, or tines.

It is understood that other embodiments will become readily apparent to those skilled in the art from the above detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

We claim:

1. A conveyor assembly for limiting the introduction of particulate matter into the interface between a driven roller and an inner surface of a continuous conveyor belt, the conveyor assembly configured to rotate about a central pivot point along a path, the conveyor assembly comprising:
   a. a conveyor frame having a leading sidewall;
   b. a discharge aperture disposed in the leading sidewall;
   c. the continuous conveyor belt having a longitudinal axis, an upper belt portion and a lower belt portion;
   d. a guard assembly mounted to the conveyor frame between the upper belt portion and the lower belt portion, the guard assembly comprising:
      i. a retaining wall member oriented at an angle that is neither parallel with nor at a right angle to the longitudinal axis of the belt and at such an angle that particulates carried on the inner surface of the lower belt portion are directed toward the discharge aperture in the leading sidewall;
   e. wherein the guard assembly is configured to discharge the particulate matter through the leading sidewall into the path of the conveyor assembly.

2. The conveyor assembly according to claim 1, wherein the conveyor frame further comprises a second sidewall and the retaining wall member extends between the leading sidewall and the second sidewall.

3. The conveyor assembly according to claim 2, wherein the guard assembly has a V-shaped cross section defining a first retaining wall and a second retaining wall; and wherein the conveyor assembly further comprises a second discharge aperture in the second sidewall.

4. The conveyor assembly according to claim 2, wherein the retaining wall member is non-porous to the particulate matter being conveyed.

5. The conveyor assembly according to claim 1, wherein the retaining wall further comprises a lower beveled edge in contact with the inner surface of the lower belt portion.

6. The conveyor assembly according to claim 1, wherein the retaining wall is curvilinear.

7. The conveyor assembly according to claim 1, further comprising a hood member that extends from the leading sidewall adjacent to a top portion of the discharge aperture such that the hood member restricts particulate matter from entering the conveyor through the discharge aperture.

8. The conveyor assembly according to claim 7, wherein:
 a. the hood member further comprises:
  i. a top hood portion that is horizontally extended and downwardly slanted;
  ii. a first side portion that is extended downwardly from the top hood portion;
  iii. a second side portion that is extended downwardly from the top hood portion; and
 b. respective flanges extend perpendicular to the at least two of the top hood portion, the first side portion, and the second side portion for securely mounting the hood member to the conveyor frame.

9. The conveyor assembly according to claim 1, further comprising:
 a. wherein the guard assembly further comprises:
  i. a mounting member for mounting the guard assembly to the conveyor frame; and
 b. wherein the retaining wall is vertically adjustably mounted to the mounting member, thereby allowing vertical adjustments to the position of the retaining wall relative to the conveyor frame.

10. The conveyor assembly according to claim 1, further comprising:
 a. wherein the guard assembly further comprises:
  i. a mounting member for mounting the guard assembly to the conveyor frame; and
 b. wherein the retaining wall is horizontally adjustably mounted to the mounting member, thereby allowing horizontal adjustments to the position of the retaining wall relative to the conveyor frame.

11. A conveyor assembly for limiting the introduction of particulate matter into the interface between a driven roller and an inner surface of a continuous conveyor belt, the conveyor assembly comprising:
 a. a conveyor frame having a first sidewall;
 b. a discharge aperture disposed in the first sidewall;
 c. the continuous conveyor belt having a longitudinal axis, an upper belt portion and a lower belt portion;
 d. a guard assembly mounted to the conveyor frame between the upper belt portion and the lower belt portion, the guard assembly comprising:
  i. a retaining wall member oriented at an angle that is neither parallel with nor at a right angle to the longitudinal axis of the belt and at such an angle that particulates carried on the inner surface of the lower belt portion are directed toward the discharge aperture in the first sidewall; and
 e. a hood member that extends from the first sidewall adjacent to a top portion of the discharge aperture such that the hood member restricts particulate matter from entering the conveyor through the discharge aperture.

12. The conveyor assembly according to claim 11, wherein:
 a. the hood member further comprises:
  i. a top hood portion that is horizontally extended and downwardly slanted;
  ii. a first side portion that is extended downwardly from the top hood portion;
  iii. a second side portion that is extended downwardly from the top hood portion; and
 b. respective flanges extend perpendicular to the at least two of the top hood portion, the first side portion, and the second side portion for securely mounting the hood member to the conveyor frame.

13. The conveyor assembly according to claim 11, wherein the guard assembly has a V-shaped cross section defining a first retaining wall and a second retaining wall; and wherein the conveyor assembly further comprises a second discharge aperture in a second sidewall.

14. The conveyor assembly according to claim 11, wherein the retaining wall member is non-porous to the particulate matter being conveyed.

15. The conveyor assembly according to claim 11, wherein the retaining wall is comprised of an Ultra High Molecular Weight plastic.

16. The conveyor assembly according to claim 11, wherein the retaining wall is curvilinear.

17. A guard assembly kit for use with a sweep conveyor having a conveyor frame, a first sidewall, and a continuous belt driven between a driven roller and a second roller thereby defining an upper belt portion and a lower belt portion, the continuous belt having a longitudinal axis, the guard assembly kit comprising:
 a. a mounting member configured to mount to the conveyor frame between the upper belt portion and the lower belt portion; and
 b. a retaining wall member configured to mount to the mounting member and adapted to be positioned at an angle that is neither parallel with nor at a right angle to the longitudinal axis of the belt such that particulates carried on the inner surface of the lower belt portion are directed toward the first sidewall of the sweep conveyor;
 c. a hood member configured to be mounted to the mounting member, the hood member comprising
  i. a top portion that is outwardly extended and downwardly slanted;
  ii. a first side portion that is extended downwardly from the top portion; and
  iii. a second side portion that is extended downwardly from the top portion.

18. A method for removing material carried on an inner surface of a lower belt portion of a belt of a sweep conveyor from a bin through the regular movement of the sweep conveyor, the method comprising the steps of:
 a. Rotating a sweep conveyor through a path about a central pivot point;
 b. Contacting the inner surface of the belt with a guard assembly;
 c. Mounting the guard assembly within the sweep conveyor at an angle that is neither parallel with nor at a right angle to a longitudinal axis of the belt;
 d. Discharging the material through a discharge aperture into the path of the sweep conveyor;
 e. Removing the material from the bin through the regular movement of the sweep conveyor.

19. The method of claim 18, further comprising the step of:

a. Providing a hood member to prevent material from entering the sweep conveyor through the discharge aperture.

* * * * *